United States Patent [19]

Slavens et al.

[11] 4,306,134

[45] Dec. 15, 1981

[54] ARC WELDING PIPE APPARATUS

[75] Inventors: Clyde M. Slavens; Edward A. Clavin; James E. Alleman; Henry T. Ray, all of Houston; Edgar H. Douglas, Harris County, all of Tex.

[73] Assignee: Midcon Pipeline Equipment Co., Houston, Tex.

[21] Appl. No.: 62,905

[22] Filed: Aug. 1, 1979

[51] Int. Cl.³ .............................................. B23K 9/225
[52] U.S. Cl. .................................... 219/60 A; 219/65; 219/66; 219/125.12; 228/44.5
[58] Field of Search ...................... 219/125.11, 125.12, 219/60 R, 60 A, 65, 66; 228/44.5

[56] References Cited

U.S. PATENT DOCUMENTS

3,461,264  8/1969  Nelson ............................. 219/60 R
3,551,636 12/1970  Nelson ............................. 219/60 R Primary Examiner—Elliot A. Goldberg
Attorney, Agent, or Firm—Carl B. Fox, Jr.

[57] ABSTRACT

Pipe welding clamp apparatus, including a pair of clamp assemblies, one being of conventional design and the other being of a special design permitting access to the axial space between the clamp assemblies so that internal welding assemblies may be disposed partly within said axial space and partly at a location opposite said special clamp assembly from said axial space. Each welding assembly includes a relatively large welding electrode reel and an electrode feeder at said location, communicated with a torch assembly in said axial space through a flexible tube. Each torch assembly includes means for torch position adjustments angularly and radially, and includes novel means for oscillating the torch so that a wider root weld is formed which will bridge the welding gap between adjacent pipe ends in spite of torch position misalignment and in spite of irregularities in pipe alignment and welding gap width. Novel clamp locator means and wheel support means are also disclosed.

40 Claims, 12 Drawing Figures

ARC WELDING PIPE APPARATUS

BACKGROUND OF THE DISCLOSURE

The welding of the stringer or root weld or pass in pipeline welding is a difficult problem. When the stringer or root weld is made from the exterior of the pipe, it is difficult to achieve a sufficiently smooth weld surface at the interior of the pipe, and grinding or other finishing operations at the pipe interior are frequently required. The adjacent pipe ends must be accurately faced and accurately spaced to provide a uniform welding gap between the pipe ends. Often, obtaining adequate penetration through the root weld section is difficult, resulting in weakened welds which will not pass inspection.

Apparatus has heretofore been devised for welding of the stringer or root pass from the interior of the pipe. Such apparatus has been of limited proficiency because of the limited space available between the clamps which are necessary for clamping the pipe ends together for welding. The apparatuses which have been provided have been limited as to the amount of welding electrode wire which may be carried, so that frequent replenishing of the welding electrode wire has been required. Of special importance is the fact that such internal welding apparatus has required that the welding gap be lined up exactly perpendicular to the pipe axis, in order that weld skips will not occur around the periphery of the welding gap caused by failure of the weld to bridge the gap.

Examples of the apparatuses which have been provided in the art are shown in U.S. Pat. Nos. 3,461,264 and 3,551,636.

The present invention seeks to provide an improved pipe clamp apparatus including provision for internal welding of the stringer or root pass in pipeline welding, which will be entirely satisfactory and which will not require the precise lining up of the internal welding apparatus with the welding gap or crack, and which will not require precise alignment of the adjacent pipe ends.

SUMMARY OF THE INVENTION

The invention provides improved pipe welding clamp apparatus, including internal welding apparatus for providing welding of the stringer or root weld pass from the interior of the pipe, between two clamps each set in the end of one of adjacent pipe ends. The internal welding apparatus constitutes an improvement over earlier devices known in the art in that it provides increased welding electrode wire capacity, and does not require accurate alignment of the adjacent pipe ends, and does not require extremely accurate alignment of the welding apparatus with the welding gap. According to the invention, reels of electrode welding wire are positioned away from the space between the two pipe clamp assemblies, and the welding electrode wire is fed to one or more welding torches located between the clamp assemblies in a novel manner. Each welding torch is provided with means for oscillating the torch transversely of the welding gap so that a wider stringer or root weld is formed which will bridge a welding gap of varying width, and which even though somewhat misaligned with the welding gap will form a weld entirely encompassing the gap.

The invention provides an improved apparatus for centering and alignment of the pipe clamp apparatus, which makes it unnecessary to accurately align the pipe clamp assemblies with respect to the planes of the adjacent pipe ends. The two pipe clamping assemblies are supported by a central shaft which is rigid and which maintains the two clamp assemblies in accurate position relationships. The welding apparatus is designed so that it may be easily adapted for use in pipes of different diameters, that is, in pipes having diameters which differ by, say, two or four inches, such as pipes having 30, 32 and 34 inch external diameters.

The apparatus provides a novel easily adjustable wheel support for the apparatus, and provides a novel apparatus for driving one of the pipe clamp assemblies.

The invention provides apparatus which will provide entirely satisfactory stringer or root pass welds around the interior of abutted pipe ends, from the pipe interior in a completely automatic welding operation. The stringer welds provided are of satisfactory smoothness and appearance that no interior weld finishing operations will be required. Such stringer welds may be formed in spite of pipe end finishing operations which result in pipe ends which are not accurately perpendicular to the pipe axis, and in spite of non-uniform gap width because of slight misalignments of the pipe ends. Further, such welds may be formed in spite of so called high-low conditions wherein pipes of somewhat different interior diameters are welded together ent-to-end.

A principal object of the invention is to provide improved pipe clamp apparatus. Another object of the invention is to provide such pipe clamp apparatus including an assembly for forming an internal stringer or root weld pass in pipeline welding. Yet another object of the invention is to provide such apparatus wherein the stringer weld pass may be formed in spite of variations in the welding gap and in spite of misalignment of the pipe ends and in spite of high-low conditions, and in spite of the pipe ends being non-perpendicular to the pipe axes. A still further object of the invention is to provide such apparatus wherein internal finishing of the root or stringer weld will not be required. Another object of the invention is to provide such apparatus which is entirely automatic in operation. A still further object of the invention is to provide novel driving means for pipe clamp apparatus. A further object of the invention is to provide novel centering apparatus for alignment and support of such apparatus. Another object of the invention is to provide a novel wheel support assembly for such apparatus. A further object of the invention is to provide such apparatus which is economical, dependable, and efficient in operation.

Other objects and advantages of the invention will appear from the following detailed description of preferred embodiments, reference being made to the accompanying drawings.

DESCRIPTION OF THE PREFERRED EMBODIMENTS

Figure 1:
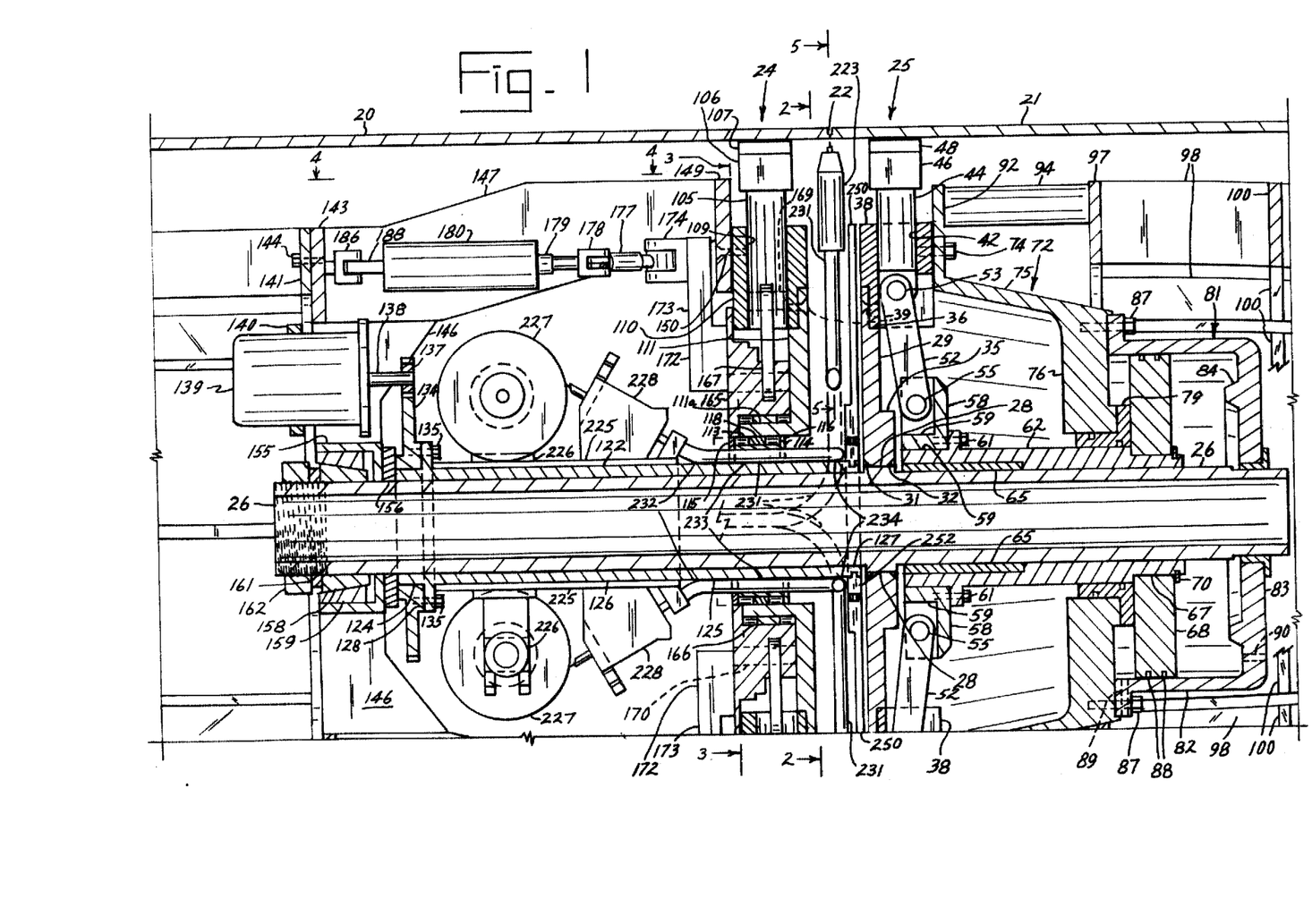
FIG. 1 is an axial cross section of a preferred form of apparatus according to the invention.

Referring now to the drawings in detail, and first to FIG. 1, a pair of pipes 20, 21 are shown in end-to-end disposition, the pipe ends being aligned and being shaped and spaced to provide a welding gap 22 therebetween, as is customary. A first pipe welding clamp assembly 24 is shown set within the end of pipe 20, and a second pipe welding clamp assembly 25 is shown set within the end of pipe 21. Each of the assemblies 24, 25 may be separately retracted to be released from the pipes. Each of the pipe welding clamp assemblies 24, 25 is supported by an elongate central shaft 26 which, except for the end assemblies which support the apparatus, extends the full length of the apparatus. Shaft 26 provides rigid support for the portion of the apparatus through which it extends so that the elements supported thereby are in relatively fixed positions one to the other.

Shaft 26 is concentrically enlarged at 28. A ring shaped element 23 is welded to enlargement 28 at 31, 32. Ring element 29 has shoulders 35, 36 circularly therearound, ring element 29 being stepwisely reduced in thickness at these shoulders. Ring element 38 is fixed to ring element 29 by a plurality of circularly spaced screws 39. Element 38 has a plurality of circularly spaced radial cylindrical passages 42 therethrough. A shaft 44 disposed slidably through each passage 42 each has a pipe wall engaging shoe 46 affixed to its outer end, each shoe 46 having a pipe wall engaging element 48 at its outer surface.

Each shaft 44 is pivotally affixed to a toggle link 52 at its inner end by a pin 53. The inner end of each link 52 is pivotally connected by a pin 55 to ring member 58 which has plural radial slots 59 circularly spaced therearound which the pin elements 55 are disposed. Ring member 58 is fixed by screws 61 around a sleeve 62 which slidably engages the outer surface of shaft 26. Bearing sleeve element 65 is provided between sleeve 62 and shaft 26 over a portion of the length of sleeve 62.

Shaft 62 is uniformally diametrically reduced at 67 and a piston 68 is disposed around reduced portion 67, fixed in place by split ring 70.

An annularly shaped housing 72 is fixed to ring element 38 by plural circularly spaced screws 74. Housing 72 has conically tapered sidewall 75 and end wall 76. A ring shaped bearing element 79 of L-shaped cross section is disposed between housing 72 and sleeve 65, and has seals inwardly and outwardly thereof. Another housing 81 having annular side wall 82 and end wall 83, and having annular spacing formation 84, is fixed concentrically to housing 72 by plural circularly spaced screws 87, and piston 68 is slidably fitted therein. Piston 68 has seals 88 therearound to slidably seal with wall 82 of housing 81. Suitable ports 89, 90 are provided through housing 81 so that hydraulic fluid may be imposed at the opposite sides of the piston 68 to move the piston in customary fashion.

When piston 68 is moved, sleeve 62 and ring 58 are moved longitudinally of shaft 26, in one direction to draw the outer ends of toggle links 52 inwardly, and in the other direction to drive the outer ends of toggle links 52 outwardly. Shafts 44 and pipe engaging shoes 46, therefore, may be moved inwardly or outwardly to be inward of pipe 21 or to be set in pipe 21.

Clamp assembly 25, which has just been described, is of conventional design, and as such does not form a part of the present invention. Clamp 25 is employed to fix the apparatus within the end of pipe 21, and to circularize pipe 21 in preparation for welding the end of pipe 21 to the end of pipe 20. It will be realized that the plurality of shoes 46 provided circularly spaced around clamp assembly 25 are simultaneously moved outwardly to be forceably engaged against the interior of the pipe wall, and are simultaneously moved inwardly to release the shoes 46 from the interior of the pipe wall.

Figure 6:
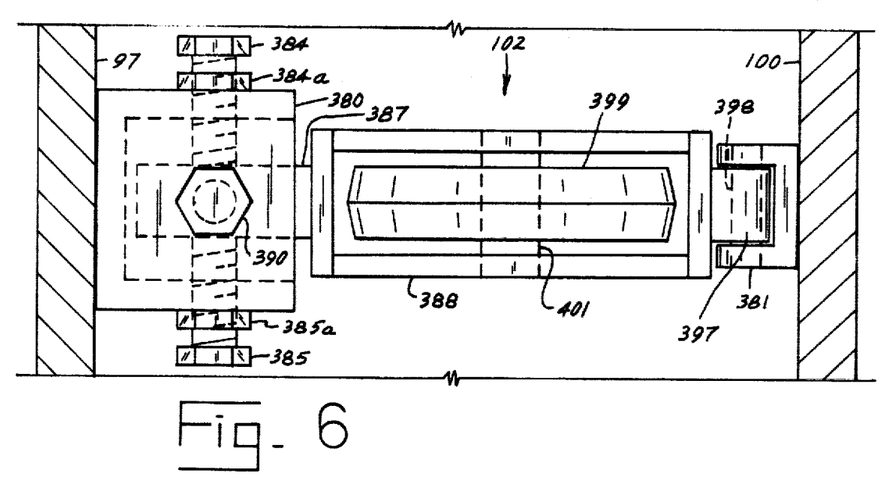
FIG. 6 is an enlarged partial elevation showing a wheel assembly usable in the apparatus shown in FIG. 1.
Figure 7:
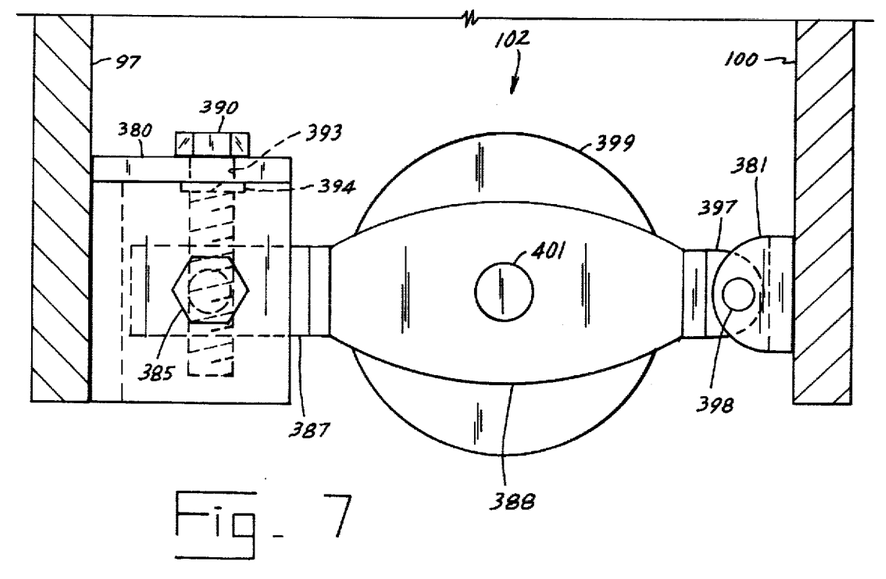
FIG. 7 is an enlarged side elevation of the apparatus shown in FIG. 6.
Figure 8:
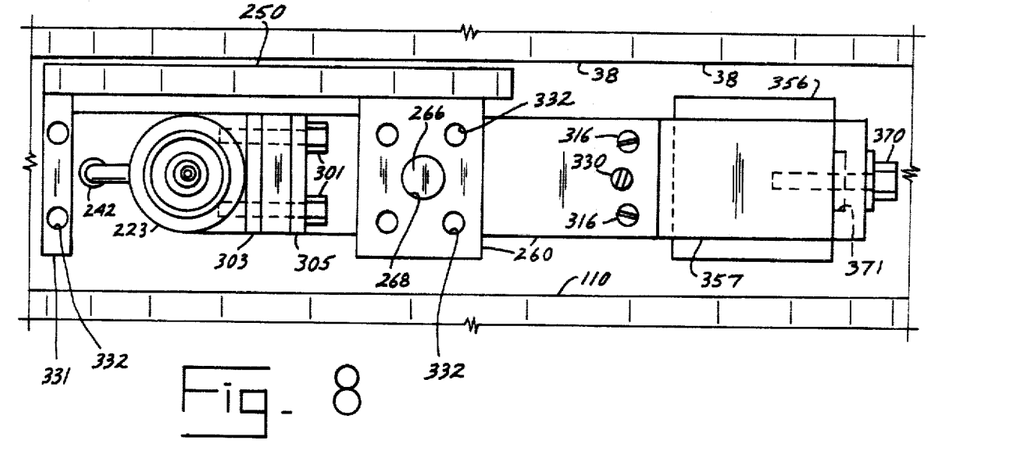
FIG. 8 is an enlarged partial elevation taken at line 8—8 of FIG. 5.

Annular ring flange 92 is fixed to ring 38 by plural circularly spaced screws 74. Flange 92 may be a separate plate not integral with housing 72, the structure being simplified in the drawings since it is conventional. Cylindrical tubular bars 94, a plurality of which are provided circularly spaced, are fixed between flange 92 and annular plate 97. Only one of the tubular bars 94 is shown in FIG. 1, the remainder being spaced around the peripheries of rings 92 and 97. A plurality of shaped plates 98 are fixed to extend forwardly from plate 97, only three being shown but any suitable plurality thereof being provided. Plates 100 are affixed between adjacent plates 98 to strengthen the structure. The forward ends of plates 98 are affixed to a nose piece, and serve as means for guiding a pipe 21 over the right hand portion of the apparatus. Additional circularly arranged plates 100 may be provided forward of those shown and parallel therewith. In FIGS. 6 and 7 there is shown an adjustable wheel assembly 102 which may be provided between plate 97 and one of the plates 100, or between longitudinally spaced plates 100, and which will be described in detail later.

Clamp assembly 24 includes a plurality of circularly spaced radially disposed cylindrical shafts 105 each carrying at its outer end a pipe engaging shoe 106 having a pipe engaging layer 107 at its outer surface. The shafts 105 are disposed through circularly spaced cylindrical radial passages 109 formed through ring element 110. Ring element 110 is affixed to and supported by a ring structure 111 having an L-shaped cross section, which is rotatively supported on circular bearing 113 disposed around annular element 114. A ring shaped plate 115 is screwed against one side of element 114, the latter having an outwardly extending peripheral flange 116 at its opposite end, the bearing 113 being retained between plate 115 and flange 116. Bearing 113 consists of two ring shaped roller bearing assemblies spaced by intermediate spacer ring 118. Bearing 113, element 114 and plate 115 must be diametrically split (not shown) for installation about sleeve 122, which is rotatively disposed about the outer surface of shaft 26.

Figure 11:
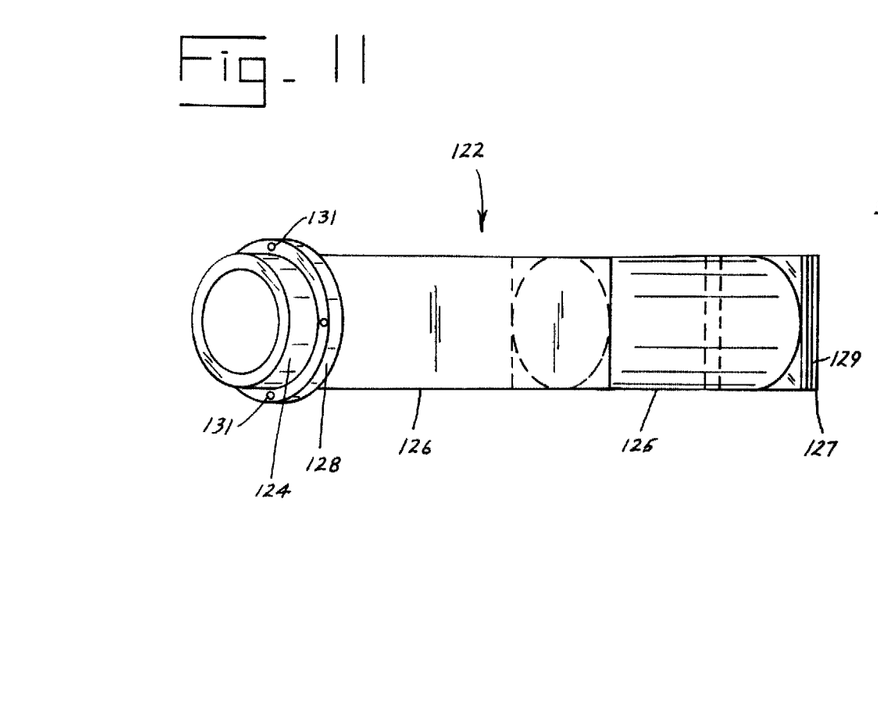
FIG. 11 is a perspective view of the carrier sleeve shown in FIG. 1.

Shaft 26 is shown separately in FIG. 11, and has cylindrical portions 124 and 125, and portions 126 and 127 of square cross section. An enlarged ring shaped flange portion 128 is provided between portions 124 and 126. Portion 127 has square sided grooves 129 therearound, and portion 128 has bolt or screw openings 131 circularly spaced therearound. Element 114 is disposed about portion 125 of shaft 122, as shown in FIG. 1.

Sleeve 122 is rotated about shaft 26 by means of ring gear 134 which is connected to sleeve 122 by plural screws 135 disposed through screw openings 131 in flange 128. Gear 134 is engaged by gear 137, which is carried on shaft 138 of hydraulic motor 139 supported by releasable bracket 140 fixed to annular ring member 141.

Ring 141 is secured to ring 143 by circularly spaced screws 144, ring 143 being supported by radially disposed plates 146. Longitudinal plates 147, a plurality of which are provided, circularly spaced, but only two of which are shown in the drawing, extend between plate 143 and annular ring plate 149. Plate 149 is fixed by circularly spaced screws 150 to ring member 110, previously mentioned. Radial plates 146 also support plates 147, being radially aligned therewith. Plates 146 extend radially from cup shaped member 155 which is disposed about the lefthand end of shaft 26, being spaced from ring gear 134 and the left hand end of sleeve 122 by spacer ring 156. Bearing elements 158, 159 are disposed within cup shaped element 155, as shown. Elements 158, 159 have mutually engaged conical surfaces, also as shown. A washer 161 is disposed between bearing element 158 and nut 162 which is screwed onto a threaded end portion of shaft 26. Tightening of nut 162 causes accurate centering of the lefthand end of shaft 26 because of a wedging action of bearing element 158 as it is forced axially against bearing element 159. The lefthand end of shaft 26 is thus forceably supported in accurately centered position, whereby the entire apparatus at its lefthand end is accurately centered and supported.

A rotative ring shaped member 165 is supported around bearing 166 disposed annularly around portion 111a of member 111. Ring 165 is irregularly shaped at its outer surface, as shown. A toggle link 167 is affixed pivotally to the slotted inner end of each shaft 105 by a pin connection 169. The inner end of each toggle link 167 is pivotally connected in an outwardly facing slot of member 165 by a pin 170. There are a plurality of the shafts 105, each radially disposed, circularly spaced around the clamp assembly 24, as previously mentioned. A pair of members 172 are affixed diametrically oppositely to ring 165 by screws (not shown). Each member 172 has a narrowed outwardly extending portion 173 spaced from the plate 149. A yoke element 174 is fixed to the outer end of portion 173 of each member 172.

Figure 3:
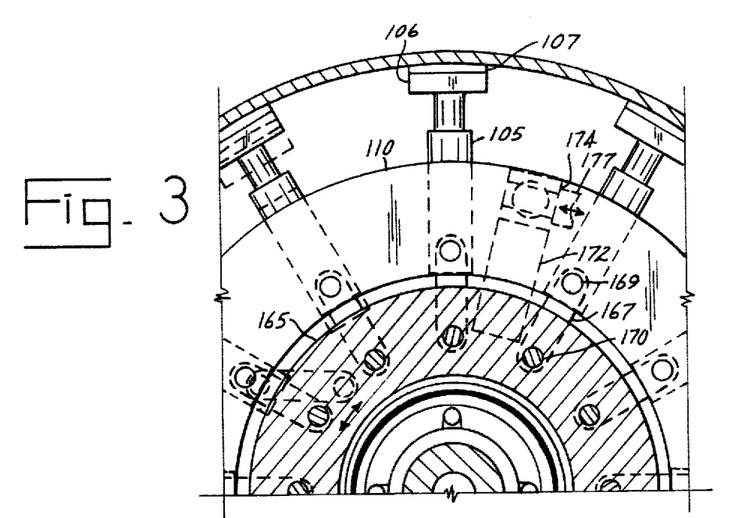
FIG. 3 is a partial transverse vertical cross section taken at line 3—3 of FIG. 1.
Figure 4:
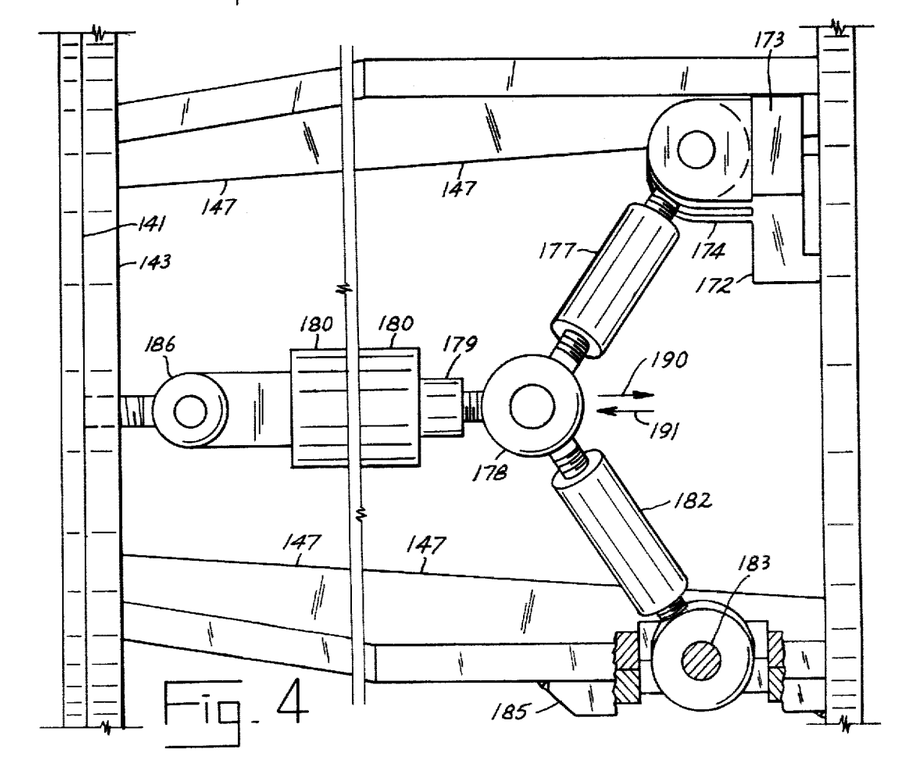
FIG. 4 is an enlarged partial top elevation taken at line 4—4 of FIG. 1.

Referring now also to FIGS. 3 and 4 of the drawings, yoke 174 is pivotally connected to an arm 177 the opposite end of which is pivotally connected to a yoke connection 178 carried on the shaft 179 of hydraulic cylinder 180. The other end of cylinder 180 is connected to plate 143. Arm 177 is disposed angularly to cylinder 180 as best shown in FIG. 4. Yoke connection 178 is also pivotally connected to an arm 182 which is pivotally connected by pin 183 to a plate member 147, which is reinforced by welded on backup plate 185. Yoke element 186 affixed to plate 143 is pivotally connected to extension 188 at the lefthand end of cylinder 180, as shown in both FIGS. 1 and 4. Member 172, being connected to rotative member 165, causes rotaton of member 165 when cylinder 180 is extended or retracted. When the shaft 179 of cylinder 180 is extended, fixture 172 is moved upwardly as it is shown in FIG. 4, and when cylinder 180 is retracted fixture 172 is moved downwardly as it is shown in FIG. 4. Rotation of member 165 upon movement of the fixtures 172 causes toggle links 167 to move shafts 105 inwardly or outwardly, depending upon the direction of rotation of member 165. Thus, the pipe engaging shoes 106 are expanded or retracted by operation of cylinder 180. Cylinder 180 has appropriate hydraulic connections (not shown) to enable its operation, this being conventional in the art. Arms 177, 182 are of adjustable lengths, adjustments being obtained by rotation of the central arm portions, as in a turnbuckle.

Further explaining the operation of cylinder 180, yoke fixture 178 is moved in the direction of arrow 190, FIG. 4, when shaft 179 of cylinder 180 is extended. This causes pivotal movements of both arms 177, 182, and increases the distance between pin 183 and yoke 174, thereby rotating fixture 172 and ring member 165 in a clockwise direction as ring member 165 is viewed from the right in each of FIGS. 1 and 4. When cylinder 180 is retracted, yoke fixture 178 is moved in the direction of arrow 191, FIG. 4, drawing pin 183 and fixture 172 toward one another, thereby rotating ring member 165 in a counter clockwise direction as viewed from its right-hand side as it is shown in FIGS. 1 and 4. This drive arrangement for rotation of ring member 165 provides a substantial mechanical advantage and enables a relatively small cylinder 180 to drive member 165 in rotation in each direction.

When two lengths of pipe 20, 21 are to be clamped by the apparatus shown in FIG. 1, clamp assembly 24 is first set in the end of pipe 21 by operation of clamp assembly 25 and expansion of the pipe engaging shoes 46 therearound. Pipe 20, at that time is not in place. Clamp assembly 25 is positioned with respect to the end of pipe 21 by the device which is illustrated in FIGS. 9 and 10 of the drawings.

At or near the upper side of the apparatus, between adjacent ones of the shafts 105 and pipe engaging shoes 106, ring 110 has a slot 195 within which arm 196 is pivotally supported by pin 198. Arm 196 is widened at its end away from pin 198 as shown in FIGS. 9 and 10, and at one side has cross plate 200 faced by plate 201 affixed thereto. Arm 196 is pivotally movable about pin 198 between a vertical position as shown in FIG. 9 and a substantially horizontal position as shown in FIG. 10. In this movement, arm 196 moves through a slot 202 through plate 149. Link member 205 having its ends offset as shown is pivotally connected to the other end of arm 196 at pin 206 and to another link member 207 at pin 208. The other end of pin 208 is fixed to a cross shaft or rod 211, rod 211 being rotatably supported between two of the plates 147. A handle 212 shown in dashed lines is affixed at one of its ends to shaft 211, to rotate therewith. A bolt or screw 214 is disposed through a hole through arm 196 and has nut 215 screwed thereonto to hold the head of the bolt against arm 196. Beyond nut 215 a tapped plate 217 is screwed onto bolt 214 and fixed in place by lock nut 218. The position of plate 217 on bolt 214 is adjustable by loosening of nut 218 and rotation of plate 217 to a new position along the bolt, after which lock nut 218 may be retightened.

Figure 9:
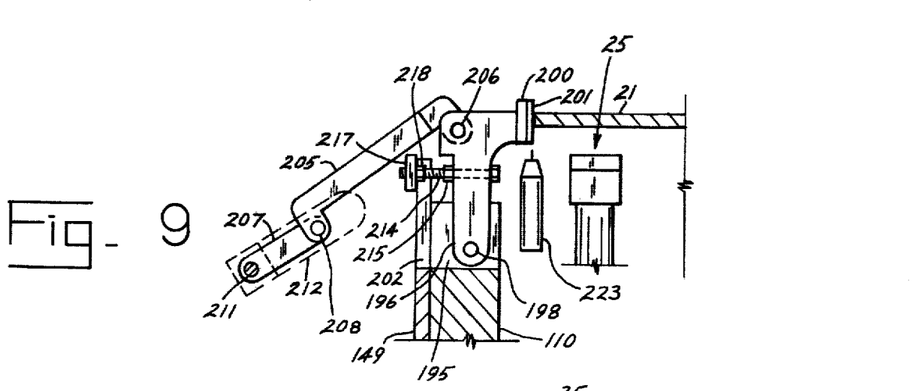
FIG. 9 is a side elevation of an assembly usable in the apparatus shown in FIG. 1.
Figure 10:
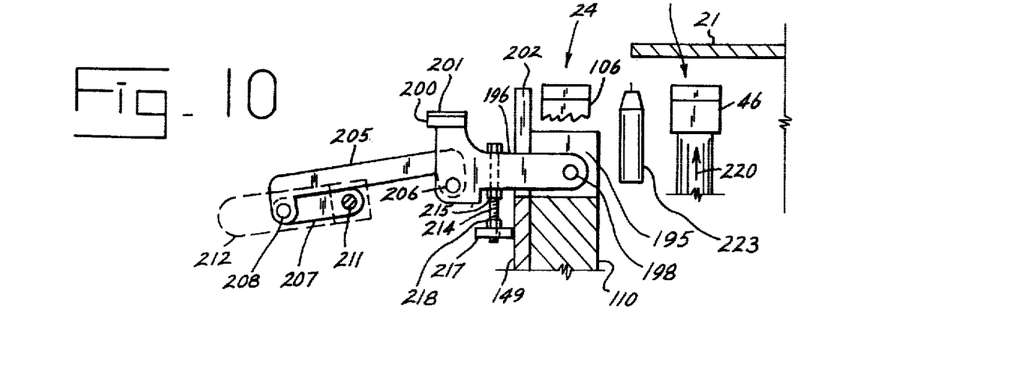
FIG. 10 is an elevation similar to FIG. 9, showing the apparatus in moved condition.

When handle 212 is pivoted by hand about shaft 211, link 207 is rotated to draw link 205 between its two positions of FIGS. 9 and 10. These movements of the handle, and the links moves arm 196 between its two described positions. With the apparatus in the position shown in FIG. 9, face plate 201 is in a position to enable placement of the apparatus adjacent the end of pipe 21.

In other words, the apparatus is moved within pipe 21 until face plate 201, serving as a stop, engages the end of the pipe. Then, clamp assembly 25 is expanded as indicated by arrow 220, FIG. 10, and then handle 212 is rotated downwardly toward the left to the position of FIG. 10 to retract arm 196 to an out of the way position. After this step has been accomplished, a pipe 20 may be drawn over the apparatus and clamped by clamp assembly 24. Usually, means not herein shown and described is employed for gaging the gap to be left between the two pipe ends so that satisfactory welding may be achieved. The position of plate 217 determines the position of face plate 201 when the apparatus is in the configuration shown in FIG. 9. Movement of plate 217 on bolt 214 moves the position of face plate 201, whereby the position of the apparatus with respect to pipe 21 may be adjusted.

The apparatus shown in FIGS. 9 and 10 is the only apparatus used to provide proper placement of the clamped apparatus within the pipes. Since precise alignment of the clamps, and of the torch 223 to be described, with the pipes not required according to the invention, only this single gaging step need be carried out in order that proper functioning of the clamps and adequate welding of the joint between the pipe ends may be obtained.

Welding torch 223, to be further described later, is positioned between clamp assemblies 24, 25 having circularly spaced sets of pipe engagement shoes 106, 46, respectively. The face of face plate 201 is disposed in alignment with torch 223 in order that when pipe 21 is brought thereagainst the end of pipe 21 will be aligned with torch 223.

The welding torch assembly, which is disposed between elements 38 and 110, 111 is not completely shown in FIG. 1.

Referring now particularly to FIGS. 1, 2, 5, and 8 of the drawings, portion 126 of sleeve 122, which is of square exterior cross section, has affixed thereto at each face thereof a relatively thin flat plate 225 fitted to cover the entire face of the sleeve. Each plate 225 has mounted thereon (only two being shown) a welding electrode wire reel supporting assembly 226 supporting a reel 227 of electrode wire, and a welding electrode wire feeder device 228. To the wire discharge of each wire feeder 228 there is connected a flexible tube 231. Each tube 231 has a small bend 232 adjacent the feeder and then extends straight along the outer surface of sleeve 122 at 233 and has a 90° bend at 234. From the 90° bend at 234 each tube curves about sleeve 122 and then is reversed bent to lead to one of the torches 223, to which it is connected by a connector 236.

Figure 2:
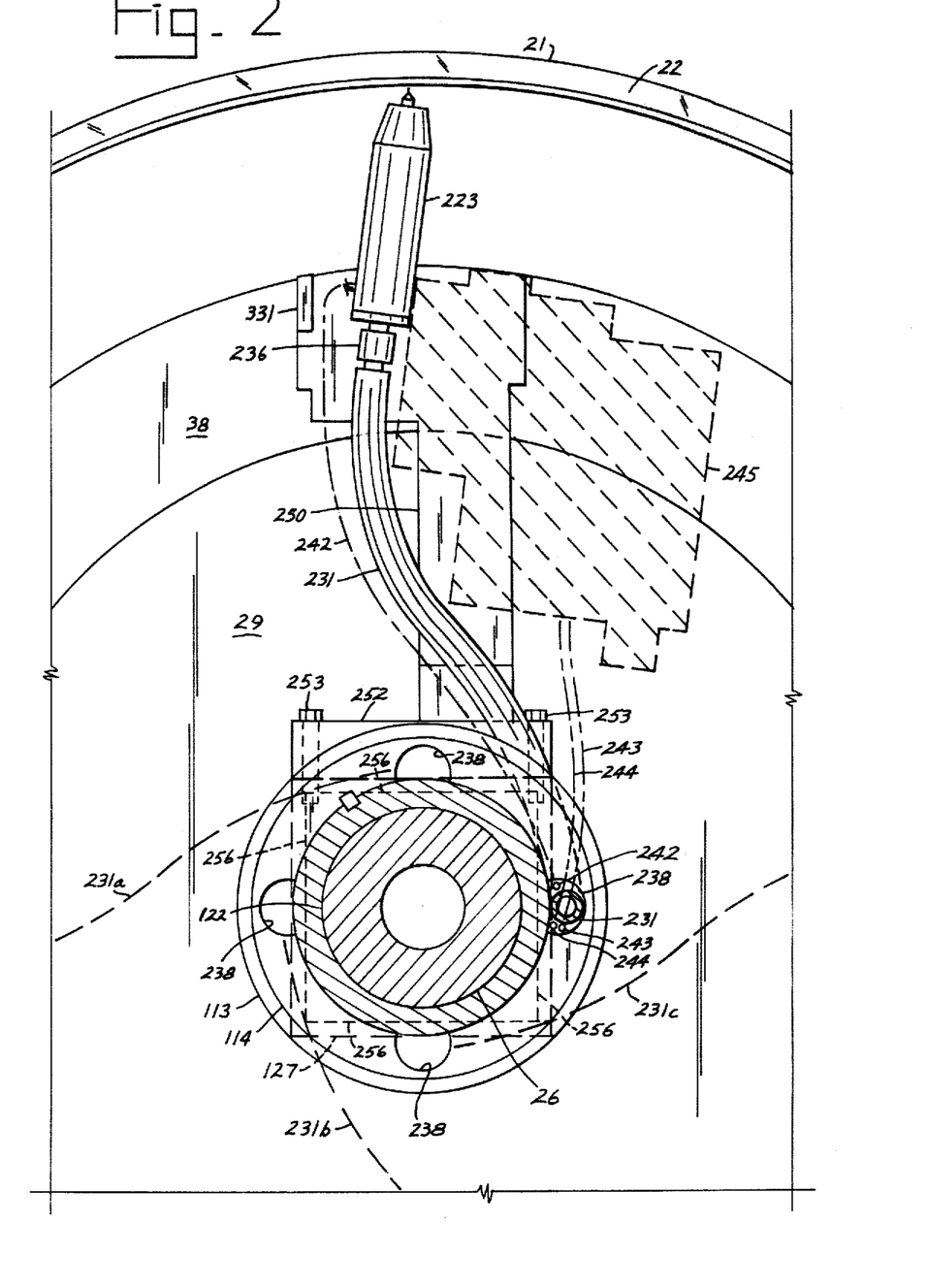
FIG. 2 is a transverse vertical crosssection taken at line 2—2 of FIG. 1, part of the showing being schematic.

Referring to FIG. 2, it is seen that each tube 231 passes through a past circle opening 238 through ring member 114, and then makes the aforesaid 90° bend at 234, after which it curves to a connection to a torch 223. Dashed lines 231a, 231b, 231c indicate the courses of the tubes 231 which are not fully shown in FIG. 2. In this manner, each of the four tubes 231 leads from a feeder 228 and thence to one of the four welding torches 223.

As indicated in FIG. 2, a shielding gas tube 242 and two air tubes 243, 244 are also disposed through each aperture or hole 238 through member 114. These extend from suitable supplies which are not shown in the drawings, but which are conventional, and lead to the welding torch support assembly as shown in FIGS. 2 and 5, the latter more particularly showing these tubes.

Figure 5:
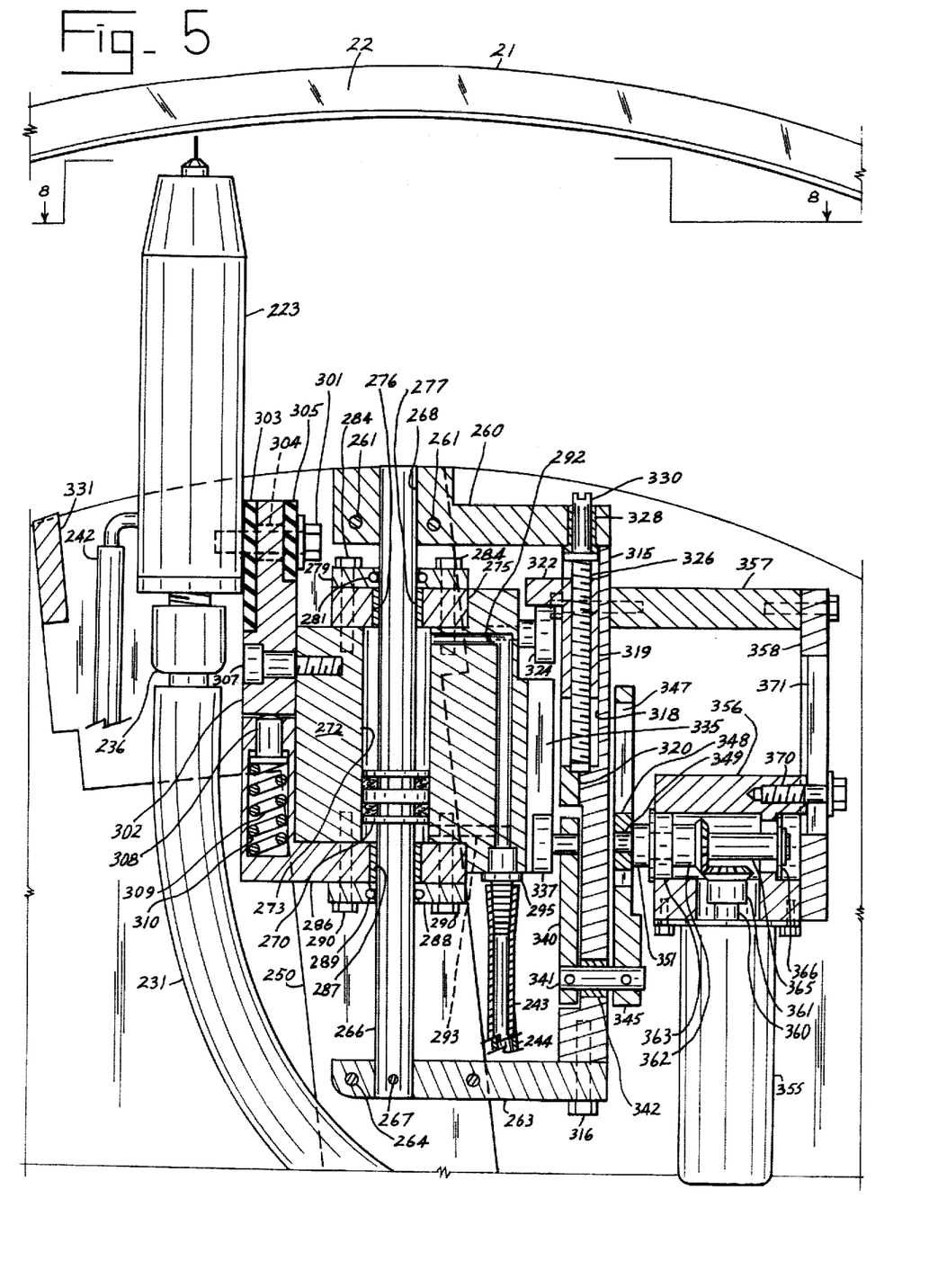
FIG. 5 is an enlarged partial vertical cross section taken at line 5—5 of FIG. 1.

The shaded area 245 in FIG. 2 indicates the welding torch support assembly which is completely shown in FIG. 5 of the drawings.

A flat plate 250, the irregular outline shape of which is shown in FIG. 2 and which is thinner at its outer portion, is affixed at its inner end to a member 252 one of which is fixed by screws 253 to each side of portion 127 of sleeve 122. Each member 252, in the form of a rectilinear bar, has a rectilinear flange 256 which closely fits within a slot 129 at one side of portion 127 of sleeve 122. The flange-slot interfit enables accurate alignment of the plates 250. The screws 253 extend into tapped openings in sleeve portion 127. By disconnection of the screws 253 holding each bar member 252 in place, an entire welding torch assembly may be readily removed.

Referring especially now to FIGS. 5 and 6 of the drawings, a fitting 260 is fixed to one side of plate 250 by screws 264. Cylindrical shaft 266 pinned to fitting 263 at cross pin 267 extends through an opening 268 through fitting 260. Shaft 266, therefore, is immovably held in place. Shaft 266 has a piston 270 in fixed position thereon intermediate its length. A body 272 has a cylindrical passage 273 therethrough. Shaft 266 extends through passage 273, and piston 270 is sealingly slidably engaged with the walls of passage 273. Plate 275, having a cylindrical passage 276 lined by sleeve 277, and plate 279 having a passage therethrough encircled by seal ring 281 are fixed to body 272 by plural screws 284. Liner 277 closely engages shaft 266, and seal ring 281 seals about shaft 266.

At the opposite end of body 272, a fixture 286 of L-shaped cross section having a shaft passage lined by sleeve 287, and a plate 288 having a shaft passage encircled by seal ring 289, are fixed to body 272 by screws 290. Thus, each end of cylindrical passage 273 in which piston 270 carried by shaft 266 is disposed is sealed fluid tight. Flow passages 292, 293 formed through body 272 are connected to tubes 243 and 244, respectively, by fittings 295. Therefore, body 272 may be moved along shaft 266 by imposing pressure at one or the other side of piston 270 through the passages 292, 293. Piston 270 remains stationary, and body 272 moves because of pressure at one side or the other of piston 270 within passage 273. This movement of body 272 is employed to move torch 223 closer to or further away from the interior wall surfaces of pipes 20, 21. It will be clear that such torch movement may be controlled from a location remote from the apparatus.

Torch 223 is mounted by plural screws 301 to a rocker member 302. Suitable insulating elements 303–305 are provided so that welding current from torch 223 will not enter the remainder of the assembly. Rocker member 302 is pivotally connected to body 272 by shoulder screw 307 screwed into body 272, as shown. Member 302 may move pivotally about screw 307. Pivotal movement of member 302 is restrained by frictional detent 308 spring biased by helical compression 309 disposed in chamber 310 within fitting 286. Detent 308 is forceably engaged against the lower side of member 302, which is arcuately curved concentric with the axis of shoulder screw 307, this arrangement enabling modification of the angle of the member 302 and the torch 223 secured thereto, but restraining the torch in the position in which it is placed because of the frictional engagement by the detent.

A plate 315 is fixed between members 260, 263 by plural screws 316, only one of which is shown. Plate 315 has a slot 318 within which slide element 319 is slidably disposed, retained by retainer plate 320 screwed by screws not shown to plate 315. Slide member 319 is of L-shape cross section, portion 322 of which is disposed to be capable of engagement with circular bearing assembly 324 screwed to body 272, as shown. Slide member 319 has a tapped opening therethrough through which screw 326 is threaded, the lower end of screw 326 being disposed within a cylindrical recess at the lower end of slot 318, and the upper end of which is journaled through plate 260 at 328. By rotation of the slotted upper end 330 of screw 326, slide member 319 is adjustably moved longitudinally of screw 326. Torch 223 is moved outwardly to welding position by outward movement of body 272, and torch 223 is moved inwardly to retracted position by inward movement of body 272. The welding position of the torch is adjusted by adjustment of the position of slide element 319. Engagement of bearing 324 against portion 322 of slide element 319 limits the movement of body 272, and of the torch 223, toward the welding gap 22 between the ends of pipes 20, 21.

Plate 331 fixed to plate 250, and member 260, have screw holes 332 at their outer surfaces by means of which one or more shield plates (not shown) may be affixed to the torch assembly to prevent spatter from the weld from reaching the inner portions of the apparatus.

In order that welding of a suitable stringer or root pass weld from the interior of the pipe may be achieved even though the ends of pipes 20, 21 are not accurately aligned, and even though gap 22 is not entirely uniform, and even though there may be a high-low situation with regard the pipe ends, torch 23 is capable of being oscillated transversely of the length of gap 22. Body 272 has a slot 335 between the opposite sides of which the roller bearing 337 is disposed. The opposite sides of slot 335 are accurately parallel, and bearing 337 is closely fitted therebetween. Bearing 337 is secured to plate 340 which is rigidly fixed to rod or shaft 341. Shaft 341 is journaled through sleeve 342 through a cylindrical opening through plate 315, and a plate 345 is rigidly fixed to shaft 341 at its end opposite plate 340. Plate 345 has a slot 347 having parallel opposite sides within which roller 348 is closely fitted.

Roller 348 is carried on a shaft 349 which is eccentric with respect to rotary member 351. Rotatable member 351 is rotated by a motor 355 fixed to body 356 which is supported by plates 357, 358 affixed to one side of plate 315. Screw 370 secures body 356 to plate 358, portion 356a of body 356 being engaged in the wider front part of slot 371 to prevent rotation of body 356 about screw 370. Shaft 360 of motor 355 carries bevel gear 361 which is engaged with a second bevel gear 362, carried by a shaft journaled at 363, stabilizing shaft 365 being rotatably supported at 366. When eccentric shaft 349 is rotated, roller 348 is oscillated. The oscillation of roller 348 causes back and forth pivotal movement of plates 340 and 345 about the axis of shaft 341.

Oscillation of plate 340 is transmitted through roller bearing 337 and slot 335 to body 272, which is thereby oscillated about the axis of shaft 266. Torch 223, carried by body 272, is also oscillated, transversely of welding gap 22. When body 22 is oscillated, roller bearing 324 rolls back and forth across the underside of portion 322 of slide element 319.

The amplitude of oscillation of the welding torch is adjustable. By moving the position of screw 370 and body portion 356a along slot 371, the amplitude of oscillation of plates 345 and 340, and thereby the amplitude of oscillation of body 272 and torch 223, are altered. If motor 355, which is energized by means not shown, is not operated, then the torch is not oscillated. Therefore, the apparatus may be employed with or without oscillation of the torch, although to insure bridging of gap 22 regardless of the misalignments between the pipe ends hereinbefore referred to several times, it is preferred that the torch be oscillated at a sufficient amplitude of oscillation that the stringer or root weld adequately bridges the welding gap to provide an initial securing together of the pipe ends.

The apparatus may easily be modified for use in pipes of different sizes. Shoes 46, 106 may be positioned for larger extent by providing spacers between the shoes and the respective shafts 44, 105 on which the shoes are carried. The extents of the welding torch assemblies may be modified by providing plates 250 of longer or shorter lengths. The apparatus may be accommodated to pipe sizes as much as four inches different in diameter.

An adjustable wheel support assembly forming part of the apparatus is shown in FIGS. 6 and 7 of the drawings. Two wheel assemblies are provided, one at each lower side of the apparatus, equally angularly spaced from the bottom center of the apparatus. Box 380, open at its bottom and forward side, is fixed to plate 97. Bracket 381 is fixed to plate 100, in line with body 380. Box 380 has screws 384, 385, disposed through tapped openings through its opposite sides. Tongue 387 of wheel support frame 388 has a tapped opening through which screw 390 is threaded. Screw 390 is rotative in opening 393 through the top of box 380, and is held against axial movement by split ring 394. Rotation of screws 390 moves tongue 387 longitudinally of screw 390. The inner ends of screws 384, 385 are tightly engaged against the opposite sides of tongue 387, lock nuts 384a, 385a prevent loosening of screws 384, 385.

At the opposite end of frame 388, collar 397 of the frame is pivotally connected to bracket 381 by pin 398. Wheel 399 is rotatively supported by axle 401 supported at opposite sides of the frame.

The position of wheel 399 is adjusted by loosening of screws 384, 385, and by rotation of screw 390, after which screws 384, 385 are re-tightened. Camber of the opposite wheels 399 may be adjusted by adjustment of the positions of screws 384, 385, to move the wheels to angular positions non-parallel to the axis of the apparatus, the camber adjustment being useful to ease steering of the apparatus through the pipes and to prevent tilting of the apparatus in the pipes.

The welding torch support assembly which has been described provides all necessary adjustments of the position of the torch. The welding position of the torch may be moved toward or away from the welding gap by rotation of screw 330 toobtain the proper position of slide 319, whereby when body 272 is moved outwardly by pressure at the inner side of piston 270 the torch is stopped in proper position. The torch angle may be adjusted by movement of plate 302 about shoulder screw 307. The amplitude of turch oscillation may be adjusted by movement of body 356 by adjustment of the position of screw 370 along slot 371.

Figure 12:
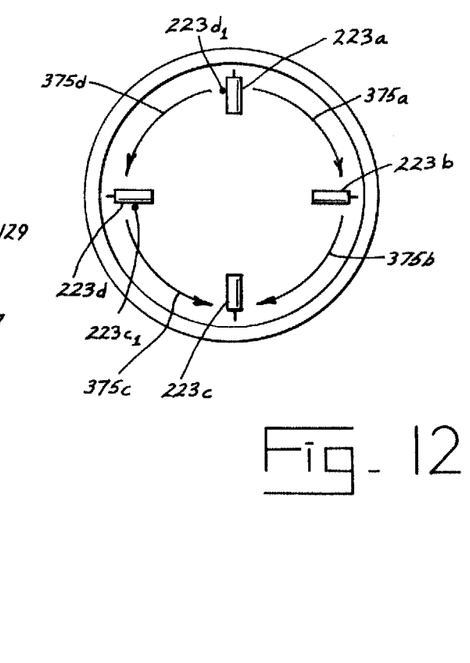
FIG. 12 is a schematic view showing the respective torch positions.

In utilization of the apparatus to weld pipe ends together, welding around the periphery of the welding gap will usually be done in a stepwise sequence in order to avoid unnecessary strains at the joint. Referring to FIG. 12 of the drawings, torches 223a, 223b, 223c, 223d will initially be at the equally circularly spaced positions shown. Consistent with modern practice, torches 223a and 223b will first form welds according to arrows 375a and 375b. The torches, of course, are moved by rotation of sleeve 122 by operation of motor 139. When these two weld segments have been completed, torches 223c and 223d will be in positions 223$c_1$ and 223$d_1$, rotated clockwise 90°. Motor 139 is then operated in the reverse direction to move the torches back to their original positions while welding segments as indicated by arrows 375c and 375d are formed. Tubes 231 and shielding gas and air tubes 242-244 are of suitable lengths and are suitably flexible that the 90° movements of the torches do not cause strains thereto. Any other welding sequence involving welding of quadrante of the full circle weld may be utilized, as will be clear to those skilled in the art, but the sequence described is that currently most frequently employed. The torch movements may be slightly greater than 90° in order that suitable weld segment overlaps may occur so that a complete root or stringer weld will be formed. As mentioned earlier, the oscillation of the torch, which will usually be up to approximately $\frac{3}{8}''$ from side to side, will adequately bridge the welding gap regardless of misalignment of the pipe ends and regardless of misalignment of the apparatus within the pipe ends caused by use of the single gauging apparatus shown in FIGS. 9 and 10.

The welding sequences may be controlled remotely from outside of the pipes, so that welding is done completely automatically. Operation of motors 139 and 355 may be controlled by switch controls disposed outside of the pipes. Operation of wire feeders 228, and of flow of air through tubes 243, 244, may readily be controlled by controls located outside of the pipes.

The invention affords an improved apparatus and system for the clamping of pipes together for welding and for providing an initial stringer or root weld to initially join the pipe ends together. The weld, will, of course, be completed by conventional methods from the pipe exteriors.

While a preferred embodiment of the apparatus according to the invention has been described and shown in the drawings, many modifications thereof may be made by a person skilled in the art without departing from the spirit of the invention, and it is intended to protect the Letters Patent all forms of the invention falling within the scope of the following claims.

We claim:

1. Pipe welding apparatus, comprising a first internal pipe clamp assembly adapted to be set in the end of a first pipe, a second internal pipe clamp assembly axially spaced from said first internal pipe clamp assembly and adapted to be set in the end of a second pipe disposed end-to-end with said first pipe, said first internal pipe clamp assembly being supported by a central shaft, said second internal pipe clamp assembly being supported around sleeve means journaled for rotation around said central shaft by circularly spaced axially extending arm means supported by said central shaft, said sleeve means including passage means past said second internal pipe clamp assembly whereby access through said sleeve means is provided between an axial space between said first and second internal pipe clamp assemblies and the side of said second internal pipe clamp assembly away from said axial space, and including plural welding assemblies disposed partially in said axial space and partially at said side of said second internal pipe clamp assembly away from said axial space, and being connected through said passage means through said sleeve means, each said welding assembly being rotatable about said central shaft with said sleeve means.

2. The combination of claim 1, each said welding assembly including electrode wire reel means and electrode wire feeder means supported by said sleeve means at said side of said second internal pipe clamp assembly away from said axial space, and each said welding assembly including a welding torch supported by said sleeve means within said axial space, and including tube means extending through said passage means between said electrode wire feeder means and each said welding torch through which electrode wire is fed from said electrode wire feeder means to each said welding torch.

3. The combination of claim 2, each said tube means comprising a flexible tube.

4. The combination of claim 3, each said welding torch being supported by a generally radially disposed plate member affixed at its inner end to said sleeve means and being rotatable with said sleeve means about said central shaft.

5. The combination of claim 4, each said welding torch including generally radially disposed shaft means supported at its opposite ends by a said plate member and having a piston fixed therearound intermediate its length, body means having a cylindrical passage through which said shaft means extends with said piston sealingly and slidably engaging the wall of said cylindrical passage, seal means between said body means and said shaft means at each end of said cylindrical passage, port means through said body means adapted for flow of fluid to said cylindrical passage at opposite sides of said piston whereby fluid pressure may be imposed at opposite sides of said piston to move said body means between inward and outward positions, each said welding torch being carried by a said body means and being movable with said body means between a welding position and a retracted position.

6. The combination of claim 5, including means for adjusting said outward position of said body means whereby said welding position each of said welding torch may be adjusted inwardly and outwardly.

7. The combination of claim 6, said adjusting means comprising adjustable stop means limiting outward movement of said body means and said welding torch.

8. The combination of claim 7, said adjustable stop means comprising a screw-adjustable slide member slidably disposed in a generally radially disposed slot, said slide member having a laterally extending portion and said body means having bearing means engageable with the inner side of said laterally extending portion when said body means is moved outwardly.

9. The combination of claim 8, including means for oscillating each said welding torch crosswise of the juncture of said first and second pipes.

10. The combination of claim 9, said oscillating means comprising an opening in one of said body means and second body means, and bearing means engaged in said opening carried by the other of said body means and second body means, and means for oscillating said second body means transversely of the length of said shaft means to cause rotary oscillatory movements of said body means and said welding torch carried thereby about the axis of said shaft means.

11. The combination of claim 10, said means for oscillating said second body means comprising a motor driven eccentric shaft engaged with said second body means.

12. The combination of claim 11, said second body means comprising first and second extending portions joined by a transverse pivot shaft supported for rotation by said plate member, said first extending portion carrying said bearing means and said opening comprising a generally radial slot in said body means, said eccentric shaft being engaged with said second extending portion.

13. The combination of claim 12, each said welding torch being carried by a support member pivotally fixed to said body means, and including frictional detent means carried by said body means for restraining free pivotal movements of said support member, whereby the angular position of said welding torch may be adjusted by forceable movement of said support member overcoming the friction of said detent means.

14. The combination of claim 13, said support member and said welding torch carried thereby being pivotally movable transverse to said end-to-end pipe juncture.

15. The combination of claim 14, said second extending portion having a generally radial slot in which said eccentric shaft is engaged, the position of said motor driven eccentric shaft being adjustable lengthwise of said generally radial slot in said second extending portion whereby the distance of said eccentric shaft from said transverse pivot shaft is adjusted and whereby the amplitude of oscillations of said body means and said welding torch are adjusted.

16. The combination of claim 1, said apparatus including radially adjustable wheel support means.

17. The combination of claim 16, said wheel support means comprising a frame having side members and end members between which a wheel is journaled for rotation, one end of said frame being pivotally connected to a first frame member of said apparatus, the other end of said frame being screw-adjustable radially inwardly and outwardly of a second frame member of said apparatus spaced axially of said first frame member, and oppositely disposed aligned screw means at opposite sides of said other end of said frame adjustable to bear against said opposite sides.

18. The combination of claim 17, said other end of said frame including an extending tongue having a radial screw threadedly engaged therethrough for making said radially inward and outward adjustments, and said aligned screw means engaging opposite sides of said tongue.

19. The combination of claim 17, said apparatus including pipe position locating means comprising pivotal body means movable between a pipe position interference position and a retracted position, and crank means for moving said pivotal body means beween said positions, said interference position being at a location whereby said first pipe abuts thereagainst when its end is radially aligned with said welding assemblies.

20. The combination of claim 19, said pivotal body means being pivotal in a radial plane intersecting the pipe axis.

21. The combination of claim 20, said pivotal body means having adjustable stop means whereby said interference position may be adjusted axially of said central shaft.

22. The combination of claim 19, said second clamp assembly including ring means having slot means therein within which said pivotal body means is pivotally supported.

23. Internal pipe welding apparatus, comprising a first internal pipe clamp assembly adapted to be set in the end of a first pipe, a second internal pipe clamp assembly axially spaced from said first internal pipe clamp assembly and adapted to be set in the end of a second pipe disposed end-to-end with said first pipe, said first internal pipe clamp assembly being supported by a central shaft, said second internal pipe clamp assembly being supported around sleeve means journaled for rotation around said central shaft by circularly spaced axially extending arm means supported by said central shaft, an axial space being provided between said first and second internal pipe clamp assemblies, welding apparatus including welding torch means carried by said sleeve means and having a first portion including said welding torch means disposed in said axial space and having a second portion disposed at the opposite side of said second internal pipe clamp assembly from said axial space and having a connecting portion extending through said sleeve means.

24. The combination of claim 23, said sleeve means including annular outwardly projecting collar means having opening means therethrough through which said connecting portion of said welding apparatus extends.

25. The combination of claim 24, said welding apparatus including plural circularly spaced welding devices each including a separate welding torch.

26. The combination of claim 24, said collar means comprising a ring keyed to said sleeve means.

27. The combination of claim 26, said welding apparatus including plural circularly spaced welding devices each including a separate welding torch.

28. The combination of claim 23, 24, 25, or 26, said first portion of said welding apparatus including said welding torch means and outwardly extending means supported by said sleeve means supporting said torch means, said second portion of said welding apparatus including welding electrode reel means and welding electrode feeder means, and said connecting portion of said welding apparatus including welding electrode conducting tube means extending from said welding electrode feeder means to said welding torch means.

29. The combination of claim 25, each said welding torch being supported by arm means extending outwardly from said sleeve means.

30. The combination of claim 29, including means for oscillating each said welding torch in a direction transverse to the juncture between said first and second pipes.

31. The combination of claim 29, each said arm means supporting a radially disposed shaft having a piston fixed intermediate its length, a body having a cylindrical passage through which said shaft is disposed and sealingly and slidably engaging said piston, each said welding torch being supported by one of said bodies, and means for oscillating each of said bodies about the respective radially disposed shaft to oscillate the welding torch carried thereby transversely of the juncture between said first and second pipes.

32. The combination of claim 31, each of said bodies being oscillated by a motor driven escentric shaft engaged with the body.

33. The combination of claim 32, each said motor driven eccentric shaft being engaged with the body which it oscillates by a pivotal rocker member.

34. The combination of claim 33, each said pivotal rocker member including a pivot shaft supported by one of said arm means and having first and second parallel bar means fixed radially outwardly from said pivot shaft, said first bar means being engaged with said body and said second bar means being engaged with said eccentric shaft.

35. The combination of claim 34, said second bar means having a slot therealong in which said eccentric shaft is engaged, means for adjusting the radial position of said eccentric shaft to adjust the amplitude of oscillation of said body means.

36. The combination of claim 35, said eccentric shaft having roller bearing means therearound engaged in said slot.

37. The combination of claim 34, said first bar means supporting roller bearing means and said body means having a radially disposed slot in which said roller bearing means supported by said first bar means is disposed.

38. The combination of claim 34, including radially adjustable slide means supported by each said arm means, each said body means having seal means at each end of said cylindrical passage and having passage means through which pressured fluid may be introduced into each end of said cylindrical passage to cause radial movement of said body means longitudinally of said shaft in each direction whereby the torch carried by the body means may be moved radially in each direction, each said body means carrying roller bearing means adapted to engage said slide means to limit outward radial movement of said body means and the torch carried thereby.

39. The combination of claim 34, each said torch being supported by pivotal body means carried by one of said body means, and including detent means for preventing free pivotal movement of said pivotal body means and said torch supported thereby, said pivotal body means and said torch supported thereby being pivotally movable transverse to said juncture between said first and second pipe by force overcoming said detent means.

40. The combination of claim 38, the radial position of said slide means being screw adjustable.

* * * * *